Nov. 28, 1967  L. J. BRACHT ET AL  3,355,532
MOLDED RESISTOR AND METHOD OF FABRICATING SAME
Filed Jan. 15, 1963

INVENTORS.
LLOYD J. BRACHT,
KENNETH L. DEVALL and
BY  HERBERT J. KRAUSE

Lockwood, Woodard, Smith & Weikart
Attorneys

United States Patent Office 3,355,532
Patented Nov. 28, 1967

3,355,532
MOLDED RESISTOR AND METHOD OF
FABRICATING SAME
Lloyd J. Bracht, Kenneth L. Devall, and Herbert J.
Krause, Huntington, Ind., assignors, by mesne assignments, to LTV Electrosystems, Inc., Greenville, Tex., a corporation of Delaware
Filed Jan. 15, 1963, Ser. No. 251,633
4 Claims. (Cl. 264—234)

This invention relates to cold-molded, encased resistors and in particular to a structure, and method for fabricating the same, comprising an encased or encapsulated power resistor of the wire-wound fiberglass and asbestos core type.

The technique of encasing power wire-wound fiberglass core resistors, to the present, has been confined almost exclusively to encapsulating the resistance elements in a ceramic case with various fill materials such as hydraulic cements, sodium silicate cements, inorganic filled epoxy resins and vitreous enamel frits. The ceramic case has become recognized as an essential part of these resistors since it affords a convenient means of providing a rigid insulation shell around the resistor assembly until the encapsulating material can be cured to a rigid mass. After curing of the encapsulating material, the ceramic case is a superfluous component of these resistors and economy dictates that it should be omitted if possible. The method of the present invention eliminates the necessity for a ceramic case in fabricating resistors.

A satisfactory insulating material for encasement of power wire-wound fiberglass core resistors must meet several requirements. The material must be rigid and self-supporting. It must possess adequate hardness to tolerate handling and assembly operations. It must provide electrical insulation and still maintain excellent heat conduction properties. It must provide protection for the resistance winding from adverse environmental conditions such as high humidity and salt spray. It must be capable of withstanding extreme overloads without burning or becoming conductive. It must withstand thermal shock without cracking and crazing, and it must not deteriorate at high temperatures.

The prior art discloses two materials which meet most of these requirements. Both are presently in use as encapsulating materials in a ceramic shell. These materials are the hydraulic cements and the vitreous enamels. All of the materials presently in use represent compromises with respect to the requirements referred to above. The sodium silicate cements are corrosive under humid conditions and the Portland type hydraulic cements deteriorate at the high temperature. None of these cements are in themselves moisture resistant. The vitreous enamels crack and craze during thermal shock although these do have advantages with respect to others of the requirements referred to above.

It is an object of this invention to provide a method of manufacturing resistors of the type referred to above without use of a ceramic case.

A more specific object of the present invention is to provide a cold-molded resistor using a filled silicone resin.

It is still a further object of this invention to provide a cold-molded resistor case which meets the requirements for rigidity, hardness, thermal shock resistance, etc., referred to above.

The objects of the invention are accomplished by forming a dry powder mixture of inorganic fibers, pigments and mica. Silicone resins, in a liquid solution or solvent are then added to the powders. By heating and tumbling all of the liquid solvents from the resin solution are removed to produce a dry, granular product. This product is then agitated at high speed and sifted through a fine mesh screen to provide a compound of controlled granulation. The granulated compound is then placed in a mold which contains the resistance element and is pressed to compact the powder. The encapsulated resistor is then cured through a time-temperature cycle.

The full nature of the invention will be understood from the accompanying drawings and the following description and the claims.

Figure 1:
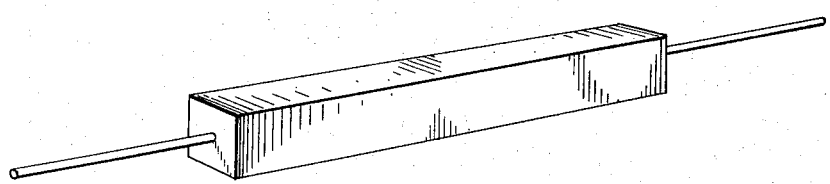
FIG. 1 is a perspective view showing a resistor fabricated in accord with the method of the invention.

The dry ingredients entering into the granular molding compound include an inert, fibrous material which is preferably calcium metasilicate ($CaSiO_3$) in fibrous form referred to in the trade by the trade name Wollastonite. Other fibrous, inorganic aggregate material, such as asbestos, glass fibre or the like could be substituted for the Wollastonite fibre.

A further dry constituent of the molding compound is aluminum silicate pigment in finely divided form, preferably of 400 mesh size. One commercial form of such material is "ASP 400" sold by Commerce Industrial Chemicals, Inc., of Chicago, Ill.

The dry components also include finely divided or ground mica, preferably of 325 mesh size. One commercial form of such material is 325 mesh mica, water ground, sold by The English Company, Forrest Park, Ill. Also included in the dry components, if desired, is a coloring element or stain in fritted or powdered form. While any glaze stain could be used, a preferred commercial form of this material is "P 105" brown stain, vitreous type sold by Ferrule Corp. of Pittsburgh, Pa.

The dry components referred to above are weighed out and dry blended preferably by tumbling in the proportion range set out below:

Inert, fibrous material.—50% to 70% of total mix weight, with 65% being a preferred portion.

Aluminum silicate pigment.—5% to 20% of total mix weight, with 12% being a preferred portion.

Ground mica.—4% to 10% of total mix weight, with 5.5% being a preferred portion.

Stain (when used).—.5% to 5.0% of total mix weight, the preferred portions set out herein requiring 1.5%.

As the dry powders are tumbled, silicone resin in liquid solution is introduced. A preferred form of such resin is an 85% plus 15% mixture of soft and hard resins, respectively, a commercially available form of such resins being Dow Corning "805" Silicone Resin (soft) and "806–A" Silicone Resin (hard), both sold by Dow Corning Corp. of Midland, Mich. The commercial form of the resins referred to above are 50% solids and 50% liquid vehicle or solvent. It will be understood that resin solutions having differing solids to liquid ratios might be used.

The quantity of resin solution introduced may range from 8% to 20% of total mix weight with 16% being a preferred portion. After addition of the resin solution, the resulting mixture acquires a plastic or dough-like consistency. Tumbling of the mixture is continued, under heat not exceeding 130° F., until all the liquid introduced with the resins is removed and the remaining blended ingredients assume a dry, granular form.

The blended ingredients, in dry granular form are then mixed or tumbled at an elevated speed and sifted through a fine mesh screen (of the order of ten to thirty mesh). A controlled granulation of the blended ingredients is thus achieved. This dry ganular material may be immediately pressure molded to encapsulate a resistor or can be stored in this dry granular stage for prolonged periods. The excellent shelf life of the granular material represents one of the advantages of the method and structure of the present invention over hydraulic cement compounds which begin to set-up as soon as they are mixed and have unsatisfactory shelf life when stored in powdered or granular form.

Figure 2:
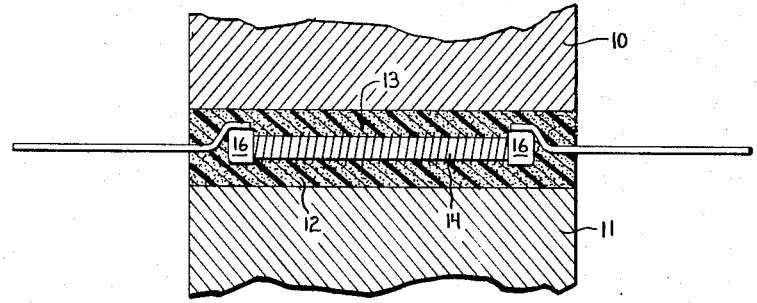
FIG. 2 is a fragmentary, cross-sectional view of a resistor in the pressing or compacting stage of the method.

Reference is now made to FIGS. 1–2 of the drawings which illustrate the molding or pressing of the dried and granulated mix. In FIG. 2 reference numeral 10 indicates schematically an upper ram portion of a press and 11 the lower ram. The granulated mix 12 is pressed in the mold cavity around a resistance element 13 which consists of a wire wound fiberglass core 14 to which terminal lead assemblies 16 have been attached. The upper and lower rams simultaneously apply equal pressure to the granulated mix in the cavity. The magnitude or unit pressure on the mix may fall within a range of one-fourth to ten tons per square inch. The resulting resistor, after completion of a curing cycle now to be described is shown in FIGS. 1 and 2.

To provide a curing cycle for the resins, the molded resistor is subsequently subjected to a time-temperature program which elevates the temperature of the resistor, in steps, to a maximum temperature of approximately 500° F. A preferred time-temperature program for curing subjects the molded resistor to a temperature of 200° F. for one-half hour, 350° F. for one hour and, finally, 500° F. for two hours.

From the foregoing it will be evident the cold molded resistor of the present invention is relatively easy to compound and has a simple curing cycle requiring heat which can be carried out in an oven. This is in distinction to the controlled humdity requirements for curing hydraulic cement mixtures. In addition to the manufacturing economies thus made possible, the resistor of the present invention has improved resistance to thermal shock and improved moisture resistance as compared to the cement type structures.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A method of manufacturing power resistors of the type wherein a resistance element is encased in a protective material comprising: first forming a dry mix by blending the following ingredients substantially in the listed proportions by weight of the final wet mix: inorganic fibrous material 65%, finely divided aluminum silicate pigment 12%, ground mica 6%, glaze stain 1.5%; second adding to the dry mix silicone resin in solvent to provide a final wet mix with the liquid resin solution providing substantially 16% of the total wet mix weight; third heating tumbling and sifting the final wet mix to evaporate said solvent from the final mix and to provide a controlled granulation thereof; fourth compressing the granulated mix about the resistance element at a pressure ranging from one-quarter to ten tons per square inch; and finally subjecting the molded resistor to a time-temperature cycle of approximately 200° F. for one-half hour, 350° F. for one hour and 500° F. for two hours.

2. A method of manufacturing power resistors of the type wherein a resistance element is encased in a protective material comprising: first forming a dry mix by blending the following ingredients in proportions by weight of the final wet mix which fall within the following range: inorganic fibrous material 50% to 70%, finely divided aluminum silicate pigment 5 to 20%, ground mica 4 to 10%; second adding to the dry mix silicone resin in solvent to provide a final wet mix with the liquid resin solution providing 8 to 20% of the total wet mix weight; third heating tumbling and sifting the final wet mix to evaporate said solvent from the final mix and to provide a controlled granulation thereof; fourth compressing the granulated mix about the resistance element at a pressure ranging from one-quarter to ten tons per square inch; and finally subjecting the molded resistor to a time-temperature cycle of approximately 200° F. for one-half hour, 350° F. for one hour and 500° F. for two hours.

3. A method of manufacturing power resistors of the type wherein a resistance element is encased in a protective material comprising: first forming a dry mix by blending the following ingredients in proportions by weight of the final wet mix which fall within the following range: inorganic fibrous material 50 to 70%, finely divided aluminum silicate pigment 5 to 20%, ground mica 4 to 10%; second adding to the dry mix silicone resin in solvent to provide a final wet mix with the liquid resin solution providing substantially 16% of the total wet mix weight; third heating tumbling and sifting the final wet mix to evaporate said solvent from the final mix and to provide a controlled granulation thereof; fourth compressing the granulated mix about the resistance element at a pressure ranging from one-quarter to ten tons per square inch; and finally subjecting the molded resistor to a time-temperature cycle which elevates the temperature of the resistors in steps to approximately 500° F.

4. A method of manufacturing power resistors of the type wherein a resistance element is encased in a protective material comprising: first forming a dry mix by blending the following ingredients substantially in proportions by weight of the final wet mix which fall within the following range: inorganic fibrous material 50 to 70%, finely divided aluminum silicate pigment 5 to 20%, ground mica 4 to 10%; second adding to the dry mix silicone resin in solvent to provide a final wet mix with the liquid resin solution providing 8 to 20% of the total wet mix weight; third heating tumbling and sifting the final wet mix to evaporate said solvent from the final mix and to provide a controlled granulation thereof; fourth compressing the granulated mix about the resistance element at a pressure ranging from one-quarter to ten tons per square inch; and finally subjecting the molded resistor to a time-temperature curing cycle.

References Cited

UNITED STATES PATENTS

| | | | |
|---|---|---|---|
| 1,181,800 | 5/1916 | Randolph | 29—155.63 |
| 2,114,458 | 4/1938 | Schafer | 338—269 X |
| 2,537,061 | 1/1951 | Korhring | 338—269 X |
| 3,171,875 | 3/1965 | Wright et al. | 29—613 X |

JOHN F. CAMPBELL, *Primary Examiner.*

J. V. BOCK, J. L. CLINE, *Assistant Examiners.*